(12) United States Patent
Sha et al.

(10) Patent No.: US 12,732,798 B2
(45) Date of Patent: Sep. 8, 2026

(54) COMMUNICATION METHOD AND APPARATUS

(71) Applicant: HUAWEI TECHNOLOGIES CO., LTD., Shenzhen (CN)

(72) Inventors: Tong Sha, Beijing (CN); Junren Chang, Beijing (CN); Bingzhao Li, Beijing (CN); Shulan Feng, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 450 days.

(21) Appl. No.: 18/343,315

(22) Filed: Jun. 28, 2023

(65) Prior Publication Data

US 2023/0345232 A1 Oct. 26, 2023

Related U.S. Application Data

(63) Continuation of application No. PCT/CN2020/142380, filed on Dec. 31, 2020.

(51) Int. Cl.
*H04W 8/24* (2009.01)

(52) U.S. Cl.
CPC .................................... *H04W 8/24* (2013.01)

(58) Field of Classification Search
CPC ........ H04W 24/02; H04W 8/24; H04W 24/10
See application file for complete search history.

(56) References Cited

U.S. PATENT DOCUMENTS

2007/0019575 A1* 1/2007 Shaheen ........... H04W 36/0094 370/310
2017/0215065 A1* 7/2017 Vamanan ................ H04W 8/22
2018/0146365 A1* 5/2018 Dhanapal .............. H04W 8/183
2018/0343689 A1* 11/2018 Wu ..................... H04W 28/065
2020/0107187 A1 4/2020 Lee
2020/0314612 A1* 10/2020 Kang .................... H04W 72/20
2021/0329608 A1* 10/2021 Bang ..................... H04L 5/0078
2021/0360729 A1* 11/2021 Yiu ....................... H04W 76/27
2023/0164867 A1* 5/2023 Cheng ................... H04W 76/27 370/252

FOREIGN PATENT DOCUMENTS

CN 107404725 A 11/2017
EP 3565298 A1 11/2019
WO 2019158093 A1 8/2019

OTHER PUBLICATIONS

International Search Report and Written Opinion in International Appln. No. PCT/CN2020/142380, mailed on Sep. 29, 2021, 16 pages (with English translation).

(Continued)

*Primary Examiner* — Congvan Tran
(74) *Attorney, Agent, or Firm* — Fish & Richardson P.C.

(57) ABSTRACT

A communication method and apparatus are provided. One example method includes: receiving a first message from a network device, wherein the first message comprises first indication information, and the first indication information indicates to allow a request to adjust a capability mode of a terminal device to one capability mode in M capability modes; and the one capability mode in the M capability modes corresponds to a group of capability information sets, and M is an integer greater than 0; and determining the M capability modes based on the first message.

20 Claims, 8 Drawing Sheets

(56) References Cited

OTHER PUBLICATIONS

MediaTek Inc., "Temporary capability restriction for UE overheating," 3GPP TSG-RAN WG2 Meeting #103bis, R2-1813672, Oct. 8-12, 2018, 5 pages.
Huawei et al., "Thermal issues with high capability UEs," 3GPP TSG-RAN WG2 #97, R2-1701835, Athens, Greece, Feb. 13-17, 2017, 5 pages.
Extended European Search Report in European Appln No. 20967840.8, dated Jan. 2, 2024, 13 pages.

* cited by examiner

Terminal device

Access network device

Core network device

501: Capability adjustment configuration message

502: Capability adjustment configuration acknowledgment message

503: Capability adjustment configuration assistance message

Terminal device
Access network device
Core network device
701: Third message (first capability mode)
702: RRC reconfiguration message
Optionally, 703: Third indication message
Optionally, 704: RRC reconfiguration failure message

COMMUNICATION METHOD AND APPARATUS

CROSS-REFERENCE TO RELATED APPLICATIONS

This application is a continuation of International Application No. PCT/CN2020/142380, filed on Dec. 31, 2020, the disclosure of which is hereby incorporated by reference in its entirety.

TECHNICAL FIELD

This application relates to the field of wireless communication technologies, and in particular, to a communication method and apparatus.

BACKGROUND

In a communication system such as a long term evolution (long term evolution, LTE) system or a new radio (new radio, NR) system, in a process of being registered to a network, a terminal device needs to report capability information supported by the terminal device to a network device (including an access network device, a core network device, or the like). The network device may perform an operation such as resource scheduling based on the capability information of the terminal device.

After the terminal device is registered to the network, in some scenarios, the capability information may further be changed. For example, the terminal device has an overheating problem; or the terminal device reduces power consumption to save power; or the terminal device needs to adjust a capability due to a hardware sharing requirement; or a carrier frequency needs to be changed when the terminal device is severely interfered; or a capability of the terminal device is changed according to a service requirement.

In the conventional technology, when the capability information of the terminal device is changed, the terminal device needs to be re-registered to the network to update the capability information. However, a process in which the terminal device is re-registered to the network causes service interruption, thereby resulting in a long data delay and the like.

SUMMARY

An objective of implementations of this application is to provide a communication method and apparatus, to provide a solution for updating capability information of a terminal device.

According to a first aspect, this application provides a communication method, and the method is applicable to a scenario in which a capability of a terminal device is updated. The method is performed by the terminal device or a module in the terminal device. Herein, an example in which the terminal device is an execution body is used for description. The method includes: determining indication information; and sending the indication information to a network device. The indication information includes a first parameter set, and at least one of first information or second information; the first information indicates an urgency or importance degree of performing data transmission with the network device based on the first parameter set; and the second information indicates to perform a first action or trigger a first event when a rejection message for the indication information is received or no response information for the indication information is received.

According to the foregoing method, the terminal device may show, by reporting the first information, an instancy degree/the urgency degree/the importance degree of performing configuration or adjustment based on the first parameter set, and/or report, by using the second information, a consequence that the network device does not perform adjustment based on a configuration of the first parameter set, so that the network device can perform reconfiguration based on the first parameter set. In this manner, autonomy of the terminal device in performing capability adjustment can be increased. In addition, in this way, an ongoing service does not need to be interrupted, and system stability is improved.

In a possible implementation of the first aspect, the indication information further includes at least one of adjustment reason information or application duration information. The adjustment reason information indicates an adjustment reason or an adjustment purpose corresponding to the first parameter set; and the application duration information indicates application duration corresponding to the first parameter set.

In a possible implementation of the first aspect, the first parameter set is used by the network device to adjust a configuration parameter of the terminal device based on the first parameter set.

In a possible implementation of the first aspect, the indication information is carried in a capability adjustment request message or assistance information, and the capability adjustment request message is for requesting to adjust a capability of the terminal device.

In a possible implementation of the first aspect, that no response information for the indication information is received includes: no response information for the indication information is received within preset duration.

In a possible implementation of the first aspect, the first action includes at least one of the following: reporting a radio link failure; reporting a secondary cell group SCG failure; requesting radio resource control RRC connection reestablishment; performing mobility registration update; feeding back a NACK; increasing a probability of feeding back a NACK; deactivating a secondary cell SCell or secondary cell group SCG connected to the terminal device; releasing an SCell or an SCG connected to the terminal device; and performing condition switching.

In a possible implementation of the first aspect, the first event includes at least one of the following: a radio link failure; a secondary cell group SCG failure; radio resource control RRC connection reestablishment; mobility registration update; NACK feedback; an increase of a probability of NACK feedback; deactivation of a secondary cell SCell or secondary cell group SCG connected to the terminal device; release of an SCell or an SCG connected to the terminal device; and condition switching.

In a possible implementation of the first aspect, the first parameter set includes one or more of the following:

in-device coexistence IDC assistance information; a discontinuous reception DRX preference parameter; a maximum aggregated bandwidth preference parameter; a maximum carrier number preference parameter; a maximum multi-input multi-output MIMO layer number preference parameter; a minimum scheduling offset parameter; an RRC state preference parameter; and sidelink assistance information.

According to a second aspect, this application further provides a communication apparatus, and the communication apparatus implements any method provided in the foregoing first aspect. The communication apparatus may be implemented by hardware, or may be implemented by hardware executing corresponding software. The hardware or software includes one or more units or modules corresponding to the foregoing function.

In a possible implementation, the communication apparatus includes: a processor. The processor is configured to support the communication apparatus in performing a corresponding function of the terminal device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device such as a network device.

In a possible implementation, the communication apparatus includes corresponding function modules, configured to implement the steps in the foregoing method. The function may be implemented by hardware, or may be implemented by hardware executing corresponding software. The hardware or software includes one or more modules corresponding to the foregoing function.

In a possible implementation, a structure of the communication apparatus includes a processing unit and a communication unit. These units may perform corresponding functions in the foregoing method examples. For details, refer to the description in the method according to the first aspect. Details are not described herein again.

According to a third aspect, this application provides a communication method, and the method is applicable to a scenario in which a capability of a terminal device is updated. The method is performed by a network device or a module in the network device. Herein, an example in which the network device is an execution body is used for description. The method includes: receiving indication information from a terminal device; and determining, based on at least one of first information or second information in the indication information, to change a configuration of the terminal device based on a first parameter set. The indication information includes the first parameter set, and at least one of the first information or the second information; the first information indicates an urgency or importance degree of performing data transmission by the terminal device with the network device based on the first parameter set; and the second information indicates to perform a first action or trigger a first event when a rejection message for the indication information is received or no response information for the indication information is received.

In a possible implementation of the third aspect, the indication information further includes at least one of adjustment reason information or application duration information. The adjustment reason information indicates an adjustment reason or an adjustment purpose corresponding to the first parameter set; and the application duration information indicates application duration corresponding to the first parameter set.

In a possible implementation of the third aspect, the first parameter set is used by the network device to adjust a configuration parameter of the terminal device based on the first parameter set.

In a possible implementation of the third aspect, the indication information is carried in a capability adjustment request message or assistance information, and the capability adjustment request message is for requesting to adjust a capability of the terminal device.

In a possible implementation of the third aspect, the first action includes at least one of the following: reporting a radio link failure; reporting a secondary cell group SCG failure; requesting radio resource control RRC connection reestablishment; performing mobility registration update; feeding back a NACK; increasing a probability of feeding back a NACK; deactivating a secondary cell SCell or secondary cell group SCG connected to the terminal device; releasing an SCell or an SCG connected to the terminal device; and performing condition switching.

In a possible implementation of the third aspect, the first event includes at least one of the following: a radio link failure; a secondary cell group SCG failure; radio resource control RRC connection reestablishment; mobility registration update; NACK feedback; an increase of a probability of NACK feedback; deactivation of a secondary cell SCell or secondary cell group SCG connected to the terminal device; release of an SCell or an SCG connected to the terminal device; and condition switching.

In a possible implementation of the third aspect, the first parameter set includes one or more of the following:

in-device coexistence IDC assistance information; a discontinuous reception DRX preference parameter; a maximum aggregated bandwidth preference parameter; a maximum carrier number preference parameter; a maximum multi-input multi-output MIMO layer number preference parameter; a minimum scheduling offset parameter; an RRC state preference parameter; and sidelink assistance information.

According to a fourth aspect, this application further provides a communication apparatus, and the communication apparatus implements any method provided in the foregoing third aspect. The communication apparatus may be implemented by hardware, or may be implemented by hardware executing corresponding software. The hardware or software includes one or more units or modules corresponding to the foregoing function.

In a possible implementation, the communication apparatus includes: a processor. The processor is configured to support the communication apparatus in performing a corresponding function of the network device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device such as a terminal device.

In a possible implementation, the communication apparatus includes corresponding function modules, configured to implement the steps in the foregoing method. The function may be implemented by hardware, or may be implemented by hardware executing corresponding software. The hardware or software includes one or more modules corresponding to the foregoing function.

In a possible implementation, a structure of the communication apparatus includes a processing unit and a communication unit. These units may perform corresponding functions in the foregoing method examples. For details, refer to the description in the method according to the third aspect. Details are not described herein again.

According to a fifth aspect, a communication method is provided, and the method is applicable to a scenario in which a capability of a terminal device is updated. The method is performed by the terminal device or a module in the terminal device. Herein, an example in which the terminal device is an execution body is used for description. The method includes: receiving a first message from a network device, where the first message includes first indication information, and the first indication information indicates to allow a request to adjust a capability of the terminal device to one capability mode in M capability modes; and the one capability mode in the M capability modes corresponds to a group of capability information sets, and M is an integer greater than 0; and determining the M capability modes based on the first message.

According to the method, the terminal device can determine, by performing pre-negotiation with the network device, that the terminal device may select a capability mode from the M capability modes to perform capability adjustment, thereby increasing autonomy of capability adjustment of the terminal device. In addition, the terminal device has reported a capability mode that may be adjusted to the network device in advance. Therefore, when a terminal capability mode changes, complexity of scheduling the terminal device in a multi-capability mode by the network device may be reduced.

In a possible implementation of the fifth aspect, before the receiving a first message from a network device, the method further includes: sending a second message to the network device. The second message includes second indication information; and the second indication information indicates N capability modes, one capability mode in the N capability modes corresponds to a group of capability information sets, the M capability modes are some or all of the N capability modes, and N is an integer greater than or equal to M.

In a possible implementation of the fifth aspect, the allowing a request includes: allowing the terminal device to send an indication message or a request message to the network device. The indication message or the request message indicates to adjust a capability mode of the terminal device to one capability mode in the M capability modes.

In a possible implementation of the fifth aspect, the capability mode corresponds to an adjustment reason or an adjustment purpose.

In a possible implementation of the fifth aspect, the second message is a radio resource control RRC message or a non-access stratum message.

In a possible implementation of the fifth aspect, the second message further includes N groups of capability information sets corresponding to the N capability modes.

In a possible implementation of the fifth aspect, the capability information set includes at least one of the following capabilities:

a radio capability of the terminal device; a core network capability of the terminal device; and a positioning capability of the terminal device.

In a possible implementation of the fifth aspect, the method further includes: sending a third message to the network device. The third message includes third indication information, the third indication information indicates a first capability mode, and the first capability mode is one capability mode in the M capability modes; and the third message indicates to adjust the capability mode of the terminal device to the first capability mode.

In a possible implementation of the fifth aspect, the third message further includes fourth indication information, and the fourth indication information indicates an adjustment reason or an adjustment purpose of the first capability mode.

In a possible implementation of the fifth aspect, the third message further includes fifth indication information, and the fifth indication information indicates application duration of the first capability mode.

In a possible implementation of the fifth aspect, the method further includes: receiving a fourth message from the network device. The fourth message indicates to confirm adjusting the capability mode of the terminal device to the first capability mode.

In a possible implementation of the fifth aspect, the method further includes: performing mobility registration update if no fourth message is received from the network device within first duration after the third message is sent. The fourth message indicates to confirm adjusting the capability mode of the terminal device to the first capability mode.

In a possible implementation of the fifth aspect, the first duration is duration preconfigured for a first capability.

According to a sixth aspect, this application further provides a communication apparatus, and the communication apparatus implements any method provided in the foregoing fifth aspect. The communication apparatus may be implemented by hardware, or may be implemented by hardware executing corresponding software. The hardware or software includes one or more units or modules corresponding to the foregoing function.

In a possible implementation, the communication apparatus includes: a processor. The processor is configured to support the communication apparatus in performing a corresponding function of the terminal device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device such as a network device.

In a possible implementation, the communication apparatus includes corresponding function modules, configured to implement the steps in the foregoing method. The function may be implemented by hardware, or may be implemented by hardware executing corresponding software. The hardware or software includes one or more modules corresponding to the foregoing function.

In a possible implementation, a structure of the communication apparatus includes a processing unit and a communication unit. These units may perform corresponding functions in the foregoing method examples. For details, refer to the description in the method according to the fifth aspect. Details are not described herein again.

According to a seventh aspect, this application further provides a communication method, and the method is applicable to a scenario in which a capability of a terminal device is updated. The method is performed by a network device or a module in the network device. Herein, an example in which the network device is an execution body is used for description. The method includes: determining a first message; and sending the first message to a terminal device. The first message includes first indication information, and the first indication information indicates to allow a request to adjust a capability mode of the terminal device to one capability mode in M capability modes; and the M capability modes are some or all of N capability modes, and M is an integer greater than 0 and less than or equal to N.

In a possible implementation of the seventh aspect, the method further includes: receiving a second message from the terminal device. The second message includes second indication information; and the second indication informationtion indicates the N capability modes, one capability mode in the N capability modes corresponds to a group of capability information sets, the M capability modes are some or all of the N capability modes, and N is an integer greater than or equal to M.

In a possible implementation of the seventh aspect, the allowing a request includes: allowing the terminal device to send an indication message or a request message. The indication message or the request message indicates to adjust the capability mode of the terminal device to one capability mode in the M capability modes.

In a possible implementation of the seventh aspect, the capability mode corresponds to an adjustment reason or an adjustment purpose.

In a possible implementation of the seventh aspect, the second message is a radio resource control RRC message or a non-access stratum message.

In a possible implementation of the seventh aspect, the second message further includes N groups of capability information sets corresponding to the N capability modes.

In a possible implementation of the seventh aspect, the capability information set includes at least one of the following capabilities:

a radio capability of the terminal device; a core network capability of the terminal device; and a positioning capability of the terminal device.

In a possible implementation of the seventh aspect, the method further includes: receiving a third message from the terminal device. The third message includes third indication information, the third indication information indicates a first capability mode, and the first capability mode is one capability mode in the M capability modes; and the third message indicates to adjust the capability mode of the terminal device to the first capability mode.

In a possible implementation of the seventh aspect, the third message further includes fourth indication information, and the fourth indication information indicates an adjustment reason or an adjustment purpose of the first capability mode.

In a possible implementation of the seventh aspect, the third message further includes fifth indication information, and the fifth indication information indicates application duration of the first capability mode.

In a possible implementation of the seventh aspect, the method further includes: sending a fourth message to the terminal device. The fourth message indicates to confirm adjusting the capability mode of the terminal device to the first capability mode.

According to an eighth aspect, this application further provides a communication apparatus, and the communication apparatus implements any method provided in the foregoing seventh aspect. The communication apparatus may be implemented by hardware, or may be implemented by hardware executing corresponding software. The hardware or software includes one or more units or modules corresponding to the foregoing function.

In a possible implementation, the communication apparatus includes: a processor. The processor is configured to support the communication apparatus in performing a corresponding function of the network device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device such as a terminal device.

In a possible implementation, the communication apparatus includes corresponding function modules, configured to implement the steps in the foregoing method. The function may be implemented by hardware, or may be implemented by hardware executing corresponding software. The hardware or software includes one or more modules corresponding to the foregoing function.

In a possible implementation, a structure of the communication apparatus includes a processing unit and a communication unit. These units may perform corresponding functions in the foregoing method examples. For details, refer to the description in the method according to the seventh aspect. Details are not described herein again.

According to a ninth aspect, a communication apparatus is provided, including a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the methods according to the first aspect and any possible implementation of the first aspect through a logic circuit or executing code instructions.

According to a tenth aspect, a communication apparatus is provided, including a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the function modules of the methods according to the third aspect and any possible implementation of the third aspect through a logic circuit or executing code instructions.

According to an eleventh aspect, a communication apparatus is provided, including a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the function modules of the methods according to the fifth aspect and any possible implementation of the fifth aspect through a logic circuit or executing code instructions.

According to a twelfth aspect, a communication apparatus is provided, including a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the function modules of the methods according to the seventh aspect and any possible implementation of the seventh aspect through a logic circuit or executing code instructions.

According to a thirteenth aspect, a computer-readable storage medium is provided. The computer-readable storage medium stores a computer program or instructions, and when the computer program or the instructions is/are executed by a processor, the method in any one of the first aspect, the third aspect, the fifth aspect, the seventh aspect, or the possible implementation of any aspect is implemented.

According to a fourteenth aspect, a computer program product including instructions is provided. When the instructions are run by a processor, the method in any one of the first aspect, the third aspect, the fifth aspect, the seventh aspect, or the possible implementation of any aspect is implemented.

According to a fifteenth aspect, a chip system is provided. The chip system includes a processor, and may further include a memory, configured to implement the method in any one of the first aspect, the third aspect, the fifth aspect, the seventh aspect, or the possible implementation of any aspect. The chip system may include a chip, or may include a chip and another discrete device.

According to a sixteenth aspect, a communication system is provided. The system includes the apparatus (for example, the terminal device) according to the second aspect and the apparatus (for example, the network device) according to the fourth aspect.

According to a seventeenth aspect, a communication system is provided. The system includes the apparatus (for example, the terminal device) according to the sixth aspect and the apparatus (for example, the network device) according to the eighth aspect.

DESCRIPTION OF EMBODIMENTS

The following further describes technical solutions provided in this application by using embodiments with reference to the accompanying drawings. It should be understood that system structures and service scenarios provided in embodiments of this application are mainly used to explain some possible implementations of the technical solutions of this application, and should not be interpreted as a unique limitation on the technical solutions of this application. A person of ordinary skill in the art may learn that the technical solutions provided in embodiments of this application are also applicable to a similar technical problem as a network architecture evolves and a new service scenario emerges.

The technical solutions in embodiments of this application may be applied to various communication systems, for example, a long term evolution (long term evolution, LTE) system, and an NR system, which are not limited herein. It should be noted that, this application may be applied to an independently deployed 5G or LTE system, or applied to a non-independently deployed 5G or LTE system, for example, a dual-connectivity (dual-connectivity, DC) scenario.

In embodiments of this application, a terminal device may be a device with a wireless transceiver function or a chip that may be disposed in any device, or may be referred to as user equipment (user equipment, UE), an access terminal, a subscriber unit, a subscriber station, a mobile station, a mobile console, a remote station, a remote terminal, a mobile device, a user terminal, a wireless communication device, a user agent, or a user apparatus. The terminal device in embodiments of this application may be a mobile phone (mobile phone), a tablet computer (Pad), a computer with a wireless transceiver function, a virtual reality (virtual reality, VR) terminal, an augmented reality (augmented reality, AR) terminal, a wireless terminal in industrial control (industrial control), a wireless terminal in self driving (self driving), or the like.

An access network device may be a next generation nodeB (next Generation nodeB, gNB) in the NR system, may be an evolved nodeB (evolved nodeB, eNB) in the LTE system, or the like.

Figure 1:
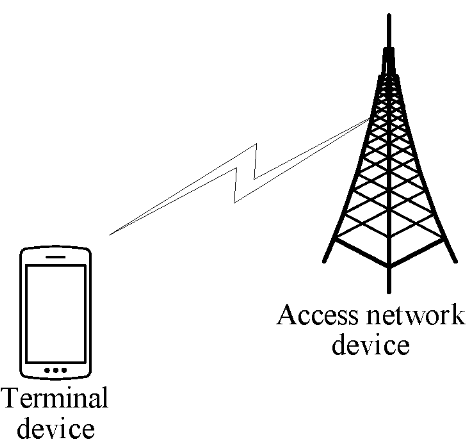
FIG. 1 is a schematic diagram of a network architecture applicable to an embodiment of this application.

FIG. 1 is a schematic diagram of a network architecture applicable to this application. As shown in FIG. 1, a terminal device may access an access network device, to obtain a service of an external network (for example, a data network (data network, DN)) through the access network device, or communicate with another device through the access network device, for example, communicate with another terminal device.

In embodiments of this application, a capability (capability) of the terminal device may be a static capability determined based on factors such as a hardware and/or software configuration of the terminal device, and indicates whether the terminal device supports a feature (feature) or a feature set (feature set). For example, if a maximum bandwidth supported to be processed by a radio frequency channel of the terminal device is 100 MHz, a maximum bandwidth supported by the terminal device is 100 MHz.

Alternatively, the capability of the terminal device may be a dynamic configuration capability. For example, a capability of a terminal may be dynamically configured based on a factor such as a working environment. For example, after the terminal device is registered to a network, in some scenarios, capability information may further be changed. For example, the terminal device has an overheating problem; or the terminal device reduces power consumption to save power; or the terminal device needs to adjust a capability due to a hardware sharing requirement; or a carrier frequency needs to be changed when the terminal device is severely interfered; or the capability of the terminal device is changed according to a service requirement. A network device may reduce the capability of the terminal device through higher layer signaling, medium access control (medium access control, MAC) layer signaling, physical (physical, PHY) layer signaling, or the like.

In embodiments of this application, interaction between the network device and the terminal device is used as an example for description. An operation performed by the network device may also be performed by a chip or a module inside the network device, and an operation performed by the terminal device may also be performed by a chip or a module inside the terminal device.

Figure 2:
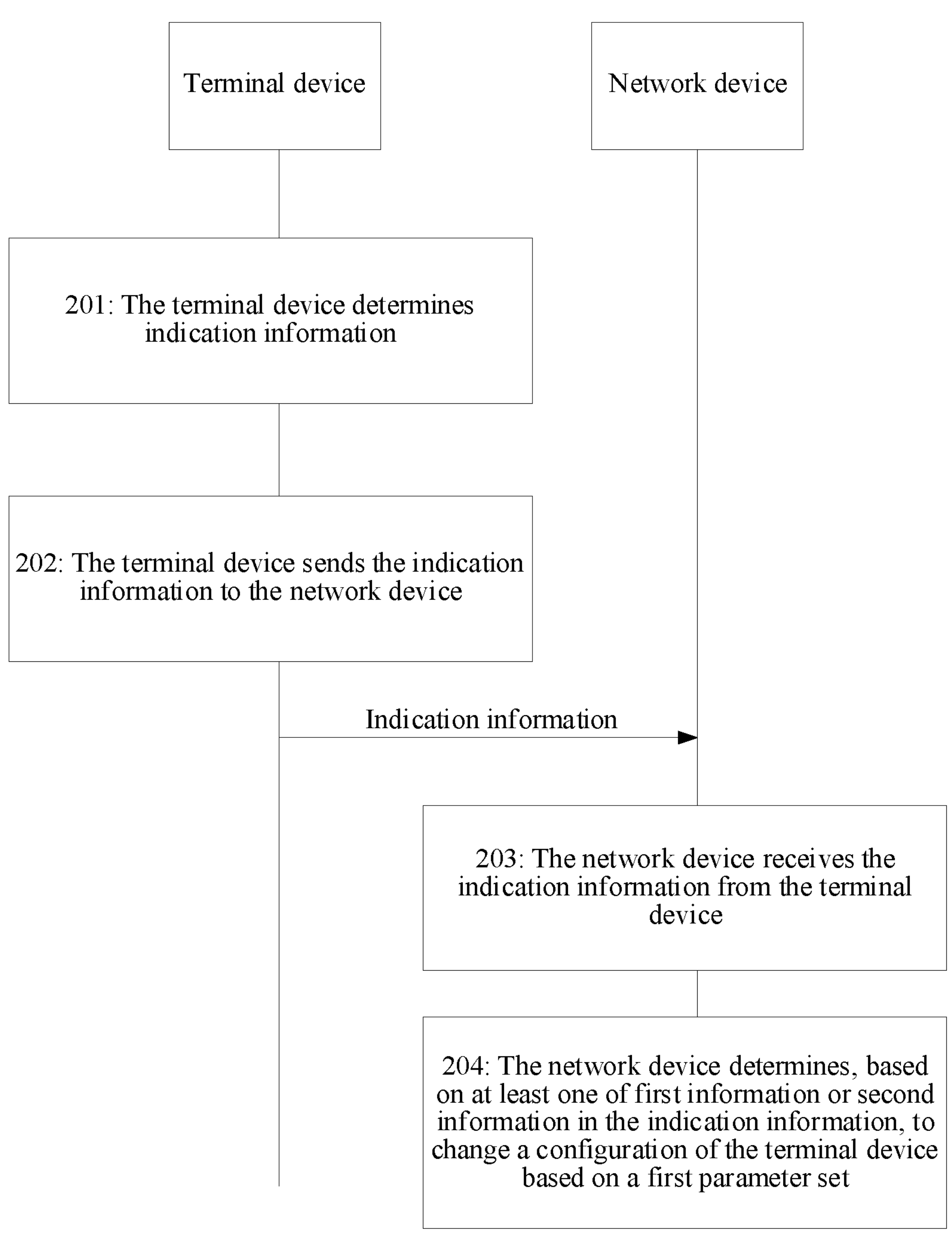
FIG. 2 is a schematic flowchart of a communication method according to an embodiment of this application.

With reference to the foregoing description, FIG. 2 is a schematic flowchart of a communication method according to an embodiment of this application. Refer to FIG. 2. The method includes the following steps.

S201: A terminal device determines indication information.

In this embodiment of this application, the indication information may be carried in a capability adjustment request message or assistance information. Alternatively, the indication information may be assistance information.

The capability adjustment request message is for requesting to adjust a capability of the terminal device. The assistance information may also be referred to as UE assistance information, and is collectively referred to as the assistance information below. The terminal device may report a desired configuration parameter (for example, the following first parameter set) to a network device based on the assistance information, and the network device may perform RRC reconfiguration with reference to the assistance information reported by the terminal device. In this way, the terminal device is prevented from updating the capability through a registration procedure, and a delay and signaling overheads are reduced.

The foregoing description is merely an example. Alternatively, the indication information may be carried in another message or information. This is not limited in this embodiment of this application.

The indication information includes a first parameter set, and the first parameter set is used by the network device to adjust a configuration parameter of the terminal device based on the first parameter set. For example, the first parameter set may include one or more of the following: in-device coexistence (in-device coexistence, IDC) assistance information; a discontinuous reception (discontinuous reception, DRX) preference parameter; a maximum aggregated bandwidth preference parameter; a maximum carrier number preference parameter; a maximum multi-input multi-output (multi-input multi-output, MIMO) layer number preference parameter; a minimum scheduling offset parameter; a radio resource control (radio resource control, RRC) state preference parameter; sidelink assistance information, and the like. The foregoing description is merely an example. The first parameter set may further include other content, and examples are not described one by one herein again.

The indication information may further include at least one of first information or second information. The first information indicates an urgency degree, importance degree, or instancy degree of performing data transmission with the network device based on the first parameter set, or indicates an urgency degree, importance degree, or instancy degree of performing reconfiguration based on the first parameter set.

How the terminal device specifically determines the urgency degree, importance degree, or instancy degree is not limited in this application. For example, the terminal device may determine the instancy degree/urgency degree/importance degree based on at least one of a temperature, a power status, a carrier interference status, a radio frequency capability occupation status, a baseband resource occupation status, a service type, or the like of the terminal device.

There may be a plurality of specific implementations of the first information. For example, in a first manner, the first information is an adjustment level, and a higher adjustment level represents a higher urgency degree, importance degree, or instancy degree of performing data transmission or changing a configuration of the terminal device based on the first parameter set.

For example, four adjustment levels are predefined: Level 0 to Level 3, where Level 0 indicates a lowest adjustment instancy degree/urgency degree/importance degree of performing data transmission or changing the configuration of the terminal device based on the first parameter set, and Level 3 indicates a highest instancy degree/urgency degree/importance degree of performing data transmission or changing the configuration of the terminal device based on the first parameter set. In this case, the first information may include two bits. For the adjustment level indicated by the first information, refer to Table 1.

TABLE 1

| First information | Adjustment level |
|---|---|
| 00 | Level 0 |
| 01 | Level 1 |
| 10 | Level 2 |
| 11 | Level 3 |

In a second manner, the first information is an adjustment factor. For example, a value of the adjustment factor ranges from 0 to 1. A greater adjustment factor represents a higher instancy degree/urgency degree/importance degree. For example, when the temperature of the terminal device increases at a slow speed, or the power of the terminal device decreases at a slow speed, or a carrier of the terminal device is interfered at a low level, or a radio frequency capability of the terminal device is lowly occupied, or a baseband resource of the terminal device is lowly occupied, or a service delay of the terminal device is sensitive, the instancy degree/urgency degree/importance degree may be considered to be low. In this case, a value of the first information (the adjustment factor) may be smaller, for example, 0.2. However, when the temperature of the terminal device increases at a quick speed, or the power of the UE decreases at a quick speed, or the carrier is interfered at a high level, or the radio frequency capability is highly occupied, or the baseband resource is highly occupied, or the service delay is insensitive, the value of the first information (the adjustment factor) may be greater, for example, 0.8.

In this embodiment of this application, a plurality of parameters in the first parameter set may correspond to one adjustment level/adjustment factor. For example, if the first parameter set includes one or more preference parameters for energy saving, one adjustment level/adjustment factor is defined for energy saving, and all preference parameters related to energy saving correspond to the adjustment level/adjustment factor.

In addition, alternatively, one adjustment level/adjustment factor may be reported for each preference parameter in the first parameter set. For example, a DRX preference parameter, a maximum bandwidth preference parameter, a maximum carrier preference parameter, a maximum MIMO layer number preference parameter, and the like respectively define corresponding adjustment levels/adjustment factors. The network device performs reconfiguration based on the adjustment level/adjustment factor corresponding to each parameter.

In a third manner, the urgency degree or importance degree may be a probability of performing a first action or triggering a first event. In this case, the first information may be an adjustment probability, indicating a probability of performing the first action or triggering the first event by the terminal device when the network device does not perform data transmission with the terminal device based on the first parameter set; or indicating a probability of performing the first action or triggering the first event by the terminal device when the network device does not perform reconfiguration with reference to the first parameter set or the network device performs reconfiguration beyond a configuration of the first parameter set. A value of the adjustment probability may range from 0% to 100%. A larger probability represents a higher instancy degree/urgency degree/importance degree of capability adjustment, and a higher possibility that the terminal device performs the first action or triggers the first event.

Specific content of the first action and the first event is described later, and details are not described herein again.

In this embodiment of this application, the second information indicates to perform the first action or trigger the first event when a rejection message for the indication information is received or no response information for the indication information is received.

The response information may be an RRC reconfiguration message sent by the network device after the network device receives the indication information, representing that data transmission is performed with the terminal device based on the first parameter set, or reconfiguration is performed with reference to the first parameter set.

The terminal device may start timing when sending the indication information, and duration of timing is preset duration. If the response information for the indication information is received within the preset duration, and the response information indicates to perform data transmission with the terminal device based on the first parameter set or perform reconfiguration with reference to the first parameter set, the terminal device may stop timing. If no response information is received within the preset duration, the first action is performed or the first event is triggered. The preset duration may be reported by the terminal device to the network device, configured by the network device, or determined in a predefined manner. This is not limited in this application.

The rejection message indicates that the network device rejects to perform data transmission with the terminal device based on the first parameter set, or indicates that the network device does not perform reconfiguration with reference to the first parameter set.

In this embodiment of this application, the first action includes at least one of the following.

1. Report a radio link failure. In a DC scenario, when the terminal device is in a master cell group (master cell group, MCG), the terminal device may report, to a master node (master node, MN), that the radio link failure occurs in the MCG. When UE is in a secondary cell group (secondary cell group, SCG), the terminal device reports, to the MN, that the radio link failure occurs in the SCG.

2. Report an SCG failure.

3. Request RRC connection reestablishment. The terminal device may request the RRC connection reestablishment from the network device.

4. Perform mobility registration update, that is, re-register to the network. A registration type is "mobile registration update".

5. Feed back a NACK, including but being not limited to feeding back an automatic repeat request (automatic repeat request, ARQ) negative acknowledgment (negative acknowledgment, NACK) at a radio link control (radio link control, RLC) layer, or feeding back a hybrid automatic repeat request (hybrid automatic repeat request, HARQ) NACK at a medium access control (medium access control, MAC) layer. Feeding back the NACK may mean that when the terminal device receives data at the RLC layer, the terminal device feeds back the ARQ NACK regardless of whether the data is correctly received; and when the terminal device receives data at the MAC layer, the terminal device feeds back the HARQ NACK regardless of whether the data is correctly received.

6. Increase a probability of feeding back a NACK. This includes but is not limited to increasing a probability of feeding back the ARQ NACK at the RLC layer or increasing a probability of feeding back the HARQ NACK at the MAC layer. Increasing the probability of feeding back the NACK may mean that when the terminal device receives data at the RLC layer, there is a specified probability of feeding back the ARQ NACK when the data is correctly received; and when the terminal device receives data at the MAC layer, there is a specified probability of feeding back the HARQ NACK when the data is correctly received.

7. Deactivate a secondary cell (secondary cell, SCell) or an SCG connected to the terminal device.

8. Release an SCell or an SCG connected to the terminal device.

9. Perform condition switching.

In this embodiment of this application, the first event includes at least one of the following:

a radio link failure; an SCG failure; RRC connection reestablishment; mobility registration update; NACK feedback; an increase of a probability of NACK feedback; deactivation of an SCell or SCG connected to the terminal device; release of an SCell or an SCG connected to the terminal device; and condition switching.

It should be noted that, in this embodiment of this application, the terminal device may first trigger the first event, and then perform the first action. Alternatively, the terminal device directly performs the first action. Alternatively, the terminal device triggers the first event, and does not necessarily perform the first action.

It should be noted that, when the indication information is the assistance information, a message field may be added to the assistance information to carry the first information or the second information.

In this embodiment of this application, the indication information may further include at least one of adjustment reason information or application duration information. The adjustment reason information indicates an adjustment reason or an adjustment purpose corresponding to the first parameter set; and the application duration information indicates application duration corresponding to the first parameter set.

S202: The terminal device sends the indication information to the network device.

S203: The network device receives the indication information from the terminal device.

S204: The network device determines, based on at least one of the first information or the second information in the indication information, to change the configuration of the terminal device based on the first parameter set.

How the network device specifically determines to change the configuration of the terminal device based on the first parameter set is not limited in this embodiment of this application, and details are not described herein again.

It should be noted that, whether the network device changes the configuration of the terminal device based on the first parameter set is specifically determined based on an actual situation, and details are not described herein again.

According to the method provided in this embodiment of this application, the terminal device may show, by reporting the first information, the instancy degree/urgency degree/importance degree of performing configuration or adjustment based on the first parameter set, and/or report, by using the second information, a consequence that the network device does not perform adjustment based on a configuration of the first parameter set, so that the network device can perform reconfiguration based on the first parameter set. In this manner, autonomy of the terminal device in performing capability adjustment can be increased.

This application further provides a capability adjustment pre-negotiation method. In the method, the terminal device can pre-negotiate with a network about a capability that may be adjusted by the terminal device, to increase the autonomy of the terminal device in performing capability adjustment, reduce scheduling complexity during capability adjustment, and provide flexibility of capability adjustment. Details are described in the following.

Figure 3:
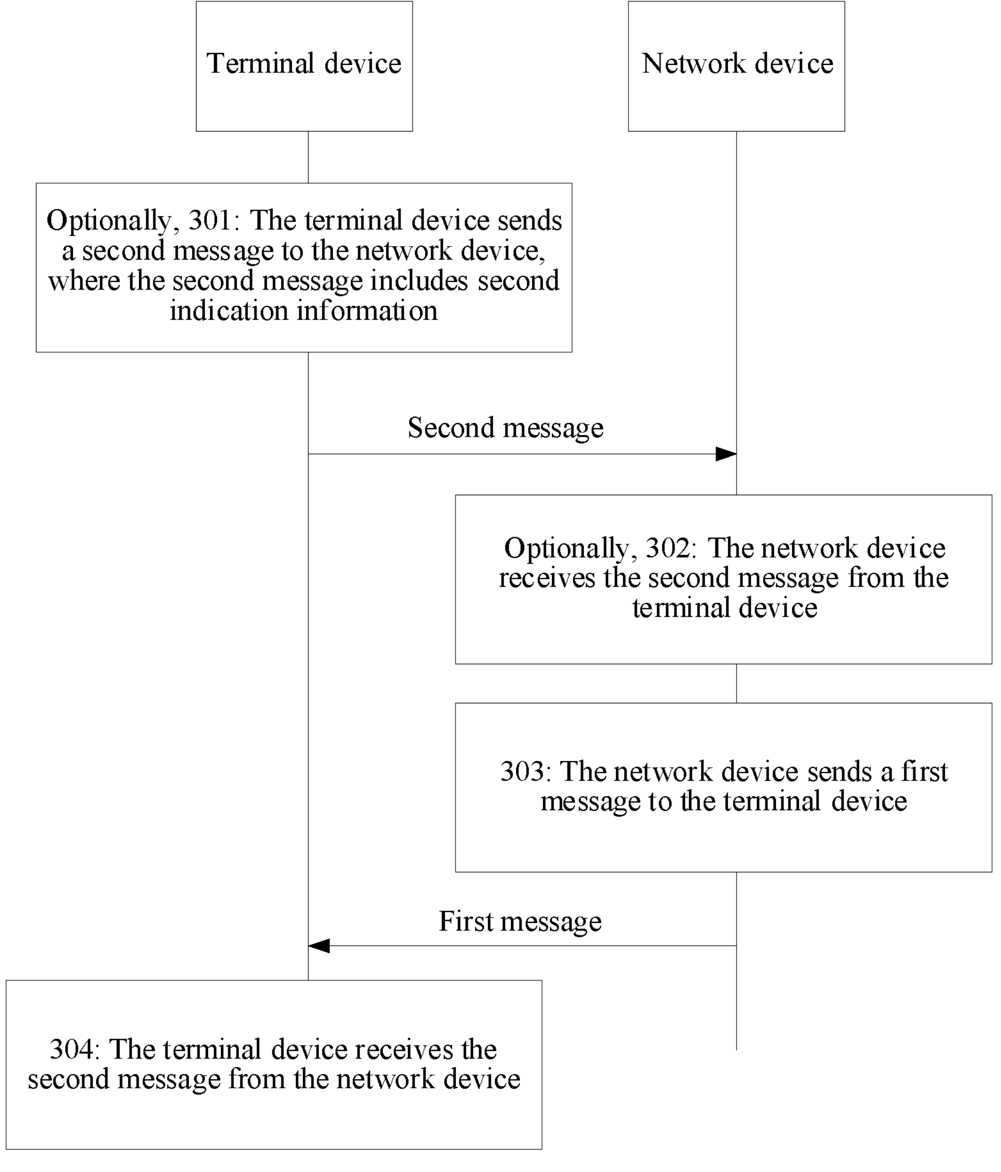
FIG. 3 is a schematic flowchart of a communication method according to an embodiment of this application.

With reference to the foregoing description, FIG. 3 is a schematic flowchart of a communication method according to an embodiment of this application. Refer to FIG. 3. The method includes the following steps.

Optionally, S301: A terminal device sends a second message to a network device, where the second message includes second indication information.

A name of the second message is not limited, and may be, for example, a capability adjustment configuration message.

The second indication information indicates N capability modes, one capability mode in the N capability modes corresponds to a group of capability information sets, and N is an integer greater than 0. The capability information set may include at least one of the following capabilities: a radio capability of the terminal device; a core network capability of the terminal device; and a positioning capability of the terminal device.

It should be noted that, the second message may be the capability adjustment configuration message sent by the terminal device to the network device after the terminal device establishes a connection to the network device, to indicate, to a network, one or more capability modes that may be adjusted by the UE. One capability mode corresponds to a group of UE capability information sets. The capability information herein may include a UE radio capability and/or a UE core network capability and/or a UE positioning capability. The message may be sent to the network device by using an RRC message or a non-access stratum (non-access stratum, NAS) message. For example, the terminal device may alternatively send the second indication information to the network device by using an independent RRC message or the NAS message after establishing an RRC connection to the network device.

For example, the second indication information may further be UE capability information (UE capability information), or the second indication information may further be carried in the UE capability information. After receiving a UE capability enquiry (UE capability enquiry) message from the network device, the terminal device may send the UE capability information to the terminal device.

In this embodiment of this application, the second message may include N groups of capability information sets, or may not include the N groups of capability information sets. When the second message does not include the N groups of capability information sets, a correspondence between a capability mode and a capability information set may be established in advance. The correspondence between the capability mode and the capability information set is known to both the terminal device and the network device, so that the network device may determine a corresponding capability information set based on the capability mode.

For example, the second indication information is one bitmap, and may represent a reported capability mode by using one bitmap. For example, there are four capability modes, which are respectively a capability mode 0 to a capability mode 3. The second indication information includes four bits. The four bits sequentially indicate the capability mode 0 to the capability mode 3 from left to right. When a bit is 0, it represents that the terminal device does not report a capability mode indicated by the bit. When a bit is 1, it represents that the terminal device reports a capability mode indicated by the bit. For example, if the second indication information is 1011, it represents that capability modes indicated by the second indication information are the capability mode 0, a capability mode 2, and the capability mode 3.

For another example, one mode identifier may be configured for each capability mode, and the second indication information includes N capability mode identifiers. For example, if the terminal device expects to perform capability adjustment in the capability mode 0 to the capability mode 3, the terminal device may report mode identifiers of the capability mode 0 to the capability mode 3.

In this embodiment of this application, capabilities corresponding to a group of capability information sets may be some or all of capabilities of the terminal device. It should be noted that, in this embodiment of this application, "capability information" is a set of functions or features included in a capability, and may also be referred to as a capability information set or a capability parameter.

Content included in the capability information set is not limited in this application. For example, the capability information set may include the following capability information: a maximum carrier bandwidth; a maximum number of aggregated carriers; and a maximum number of MIMO layers. It is assumed that capability information sets corresponding to the three capability modes indicated by the second indication information may be respectively: For information included in a capability information set corresponding to the capability mode 1: the maximum carrier bandwidth is 200 MHz, the maximum number of aggregated carriers is 8, and the maximum number of MIMO layers is 4. For information included in a capability information set corresponding to the capability mode 2: the maximum carrier bandwidth is 100 MHz, the maximum number of aggregated carriers is 4, and the maximum number of MIMO layers is 2. For information included in a capability information set corresponding to the capability mode 3: the maximum carrier bandwidth is 50 MHz, the maximum number of aggregated carriers is 2, and the maximum number of MIMO layers is 1.

It should be noted that, in this application, an adjustable capability range may be predefined. Within the predefined adjustable capability range, the terminal device determines a capability information set corresponding to each capability mode. The capability information set corresponding to the capability mode may be reported to the network device in capability signaling at a per-terminal device level, may be reported at a per-band combination (Band Combination, BC) level, may be reported at a per-band (band) level, or may be reported at a per-component carrier (Component Carrier, CC) level.

In this embodiment of this application, the capability mode may further correspond to an adjustment reason or an adjustment purpose. Different capability modes may correspond to a same adjustment reason or a same adjustment purpose, or may correspond to different adjustment reasons or different adjustment purposes. For example, a capability mode adjustment reason or capability mode adjustment purpose may include but is not limited to any one of the following: a capability mode applicable to a case when a temperature of the terminal device is too high or overheated; a capability mode applicable to power saving; a capability mode applicable to NR and wireless local area network (wireless local area network, WLAN) capability sharing; a capability mode applicable to multi-subscriber identity module (subscriber identity module, SIM) card capability sharing; a capability mode applicable to vehicle to everything (vehicle to everything, V2X) capability sharing; a capability mode applicable to an ultra-high reliability and low latency (ultra-high reliability and low latency, URLLC) service; and a capability mode applicable to a reduced capability (reduced capability, REDCAP) service.

The terminal device may explicitly or implicitly indicate an adjustment reason or an adjustment purpose of each capability mode. When the terminal device performs explicit indication, adjustment indication information may be carried in the second message, to indicate the adjustment reason or the adjustment purpose of each capability mode. When the terminal device performs implicit indication, the adjustment reason or the adjustment purpose associated with the capability mode may be pre-agreed.

In this embodiment of this application, the capability mode may further correspond to other information. For example, each capability mode may correspond to a different peak rate level. Details are not described again.

Optionally, S302: The network device receives the second message from the terminal device.

S303: The network device sends a first message to the terminal device.

A name of the first message is not limited, and may be, for example, a capability adjustment configuration acknowledgment message.

The first message includes first indication information. The first message or the first indication information may indicate M capability modes. For example, the first message or the first indication information may include M mode identifiers, and one mode identifier corresponds to one capability mode. The first indication information may further indicate to allow a request to adjust a capability of the terminal device to one capability mode in the M capability modes. M is an integer greater than 0. The allowing a request to adjust a capability of the terminal device to one capability mode in the M capability modes may refer to allowing the terminal device to send an indication message or a request message to the network device. The indication message or the request message indicates to adjust a capability mode of the terminal device to one capability mode in the M capability modes.

It should be noted that, if the terminal device sends an indication message, the indication message may represent that the terminal device performs data transmission or works based on a capability mode indicated in the indication message, and the capability mode belongs to the M capability modes. Alternatively, the capability mode may be carried in the indication message. The terminal device may not need to wait for feedback from the network device. The terminal device considers that the network device may perform configuration or reconfiguration based on the capability mode indicated in the indication message. After the reconfiguration is performed, the terminal device performs data transmission or works based on the capability mode indicated in the indication message. It should be noted that the feedback herein refers to feedback agreeing with content of the indication message, but does not refer to ACK/NACK feedback in a normal data transmission procedure.

If the terminal device sends a request message, the request message may indicate that the terminal device requests to perform data transmission or work based on a capability mode indicated in the request message. The terminal device needs to wait for feedback from the network device. When determining, based on the feedback from the network device, that the network device may perform configuration based on the capability mode indicated in the request message, the terminal device performs data transmission or works based on the capability mode indicated in the request message.

In this embodiment of this application, in a possible implementation, when the terminal device indicates the N capability modes by using the second message, the M capability modes may be selected by the network device from the N capability modes reported by the terminal device. A specific selection method is not limited in this application. For example, the capability modes that are reported by the terminal device and that are expected to be adjusted are the capability mode 1, the capability mode 2, and the capability mode 3. If the network device may allow the terminal device to be adjusted to the capability mode 1 and the capability mode 3, the capability mode 1 and the capability mode 3 are indicated by using the first indication information.

In another possible implementation, the M capability modes may be predefined in a protocol, or may be independently determined by the network device. There may also be another determining manner of the M capability modes, and examples are not described one by one herein again.

In this implementation, a type of the first message may be a broadcast message or a multicast message. The network device may indicate, by using the broadcast message or the multicast message, the M capability modes to all terminal devices that access the network device, that is to say, simultaneously indicate the M capability modes to a plurality of terminal devices.

The network device may further indicate the M capability modes to a specific type of terminal devices by using the broadcast message or the multicast message. The specific types of terminal devices include but are not limited to reduced capability (reduced capability, REDCAP) terminal devices, ultra-high reliability and low latency (ultra-high reliability and low latency, URLLC) terminal devices, vehicle to everything (vehicle to everything, V2X) terminal devices, and the like.

Certainly, the M capability modes indicated by using the first message may alternatively be for only one terminal device. This is not limited in this embodiment of this application.

The network device may configure a corresponding capability adjustment triggering manner for each capability mode. In this case, the second message may further include trigger information. The trigger information indicates capability adjustment triggering manners of the M capability modes. In this embodiment of this application, the capability adjustment triggering manner may include at least one of the following manners. A first triggering manner is a manner in which the terminal device triggers to perform capability adjustment. In this manner, when the terminal device needs to perform capability adjustment, the terminal device sends a capability mode adjustment indication to the network device. A second triggering manner is a manner in which the terminal device requests to perform capability adjustment, and the network device confirms performing capability adjustment. In this manner, when the terminal device needs to perform capability adjustment, the terminal device sends a capability mode adjustment indication to the network device, and if the terminal device receives an on-demand capability adjustment acknowledgment from the network device within a preset waiting time period, it is determined that the capability mode is successfully adjusted, where the preset waiting time period is configured by the network device or set by the terminal device. A third triggering manner is a manner in which the network device triggers to perform capability adjustment. In this manner, the network device triggers whether to perform capability adjustment, and when the network device needs to perform capability adjustment on the terminal device due to a service requirement, the network device sends an on-demand capability adjustment indication to the terminal device, to indicate an adjusted capability mode.

The network device may further configure a corresponding capability restoration manner for each capability mode. In this case, the second message may further include restoration information. The restoration information indicates capability restoration manners of the M capability modes. In this embodiment of this application, the capability restoration manner may include at least one of the following manners. A first restoration manner is a manner of restoring a capability based on timing duration before capability adjustment is performed. In this manner, when the terminal device determines that capability adjustment succeeds, for example, when the terminal device receives an RRC reconfiguration message from the network device, the terminal device starts a timer, and after the timer expires, the terminal device is restored to an original capability before capability adjustment is performed. The timing duration of the timer is application duration corresponding to the adjusted capability mode. A network may configure application duration of each capability mode, or the terminal device may indicate the application duration of the capability mode to the network device during capability adjustment.

A second restoration manner is a manner in which the terminal device triggers to restore the capability before capability adjustment is performed. In this manner, the terminal device sends a capability restoration indication to the network device, and the capability restoration indication indicates the terminal device to be restored to the original capability before capability adjustment is performed. For capability adjustment (the first triggering manner or the second triggering manner) triggered by the terminal device, the network device may configure whether to enable the terminal device to trigger capability restoration.

A third restoration manner is a manner in which the network device triggers to restore the capability before capability adjustment is performed. For capability adjustment (the third triggering manner) triggered by the network device, the network device may send the capability restoration indication to the terminal device, and the capability restoration indication indicates the terminal device to be restored to the original capability.

It should be noted that, when the network device is the access network device, for capability restoration triggered by the terminal and capability restoration triggered by the access network device, if the access network device sends the adjusted capability mode of the terminal device to the core network device during capability mode adjustment, when the capability of the terminal device is restored, the access network device may also indicate, to the core network device, the capability of the terminal device after capability restoration is performed.

S304: The terminal device receives the first message from the network device.

It should be noted that, the network device in the procedure in FIG. 3 may be an access network device, or may be a core device, which is described in different cases in the following.

Figures 4, 5:
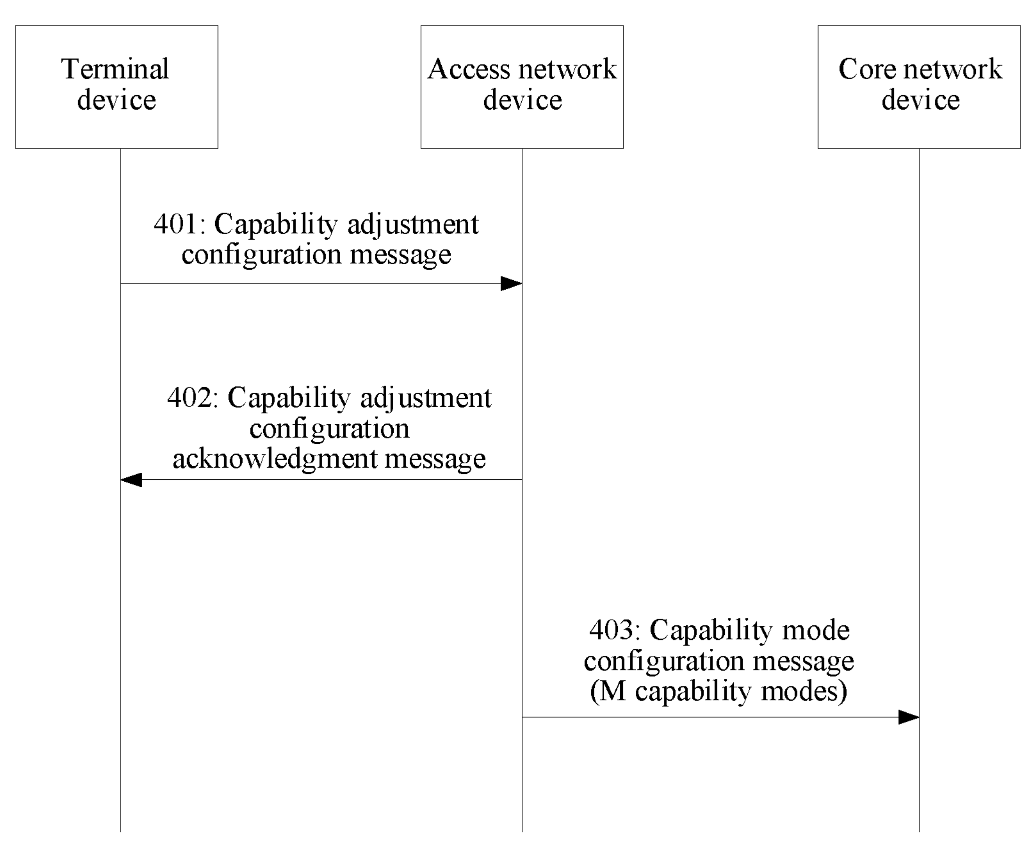
FIG. 4 is a schematic diagram of a capability adjustment configuration procedure according to an embodiment of this application.
FIG. 5 is a schematic diagram of a capability adjustment configuration procedure according to an embodiment of this application.

Specifically, an example in which the network device is an access network device is used. FIG. 4 is a schematic diagram of a capability adjustment configuration procedure according to this application.

S401: A terminal device sends a capability adjustment configuration message to the access network device.

The capability adjustment configuration message includes second indication information, and the capability adjustment configuration message may refer to the foregoing second message.

In a possible implementation, the capability adjustment configuration message is an RRC message, and the terminal device may directly send the capability adjustment configuration message to the access network device. In another possible implementation, the capability adjustment configuration message is a NAS message. The terminal device may send the capability adjustment configuration message to a core network device, and the core network device forwards the capability adjustment configuration message to the access network device.

Specific content of N groups of capability information sets included in the second message is not limited. For example, a capability information set may include a radio capability of the terminal device, a radio frequency (radio frequency, RF) capability, a measurement and mobility capability, a layer 2 capability, and the like.

S402: The access network device sends a capability adjustment configuration acknowledgment message to the terminal device.

The capability adjustment configuration acknowledgment message includes first indication information, and the capability adjustment configuration acknowledgment message may refer to the foregoing first message.

S403: The access network device sends a capability mode configuration message to the core network device.

The capability mode configuration message may indicate M capability modes.

For example, the network device is a core network device. FIG. 5 is a schematic diagram of a capability adjustment configuration procedure according to this application.

S501: A terminal device sends a capability adjustment configuration message to the core network device.

The capability adjustment configuration message includes second indication information, and the capability adjustment configuration message may refer to the foregoing second message.

Specific content of N groups of capability information sets included in the second message is not limited. For example, a capability information set includes a radio capability and a core network capability of the terminal device.

In a possible implementation, the capability adjustment configuration message is a NAS message, and the terminal device may send the capability adjustment configuration message to the core network device through an access network device, where when receiving the NAS message from the terminal device, the access network device transparently forwards the NAS message to the core network device.

In another possible implementation, the capability adjustment configuration message is an RRC message. The terminal device may send the capability adjustment configuration message to the access network device, and the access network device forwards the capability adjustment configuration message to the core network device in this implementation,

S502: The core network device sends a capability adjustment configuration acknowledgment message to the terminal device.

The capability adjustment configuration acknowledgment message includes first indication information, and the capability adjustment configuration acknowledgment message may refer to the foregoing first message.

It should be noted that, the capability adjustment configuration acknowledgment message may be a NAS message, and the core network device may send the capability adjustment configuration acknowledgment message to the terminal device through the access network device.

S503: The core network device may further send a capability adjustment configuration assistance message to the access network device. The capability adjustment configuration assistance message indicates M capability modes.

The M capability modes are candidate capability modes used when the terminal device performs capability adjustment, and are M capability modes that the terminal device is allowed to adjust.

Figures 6, 7:
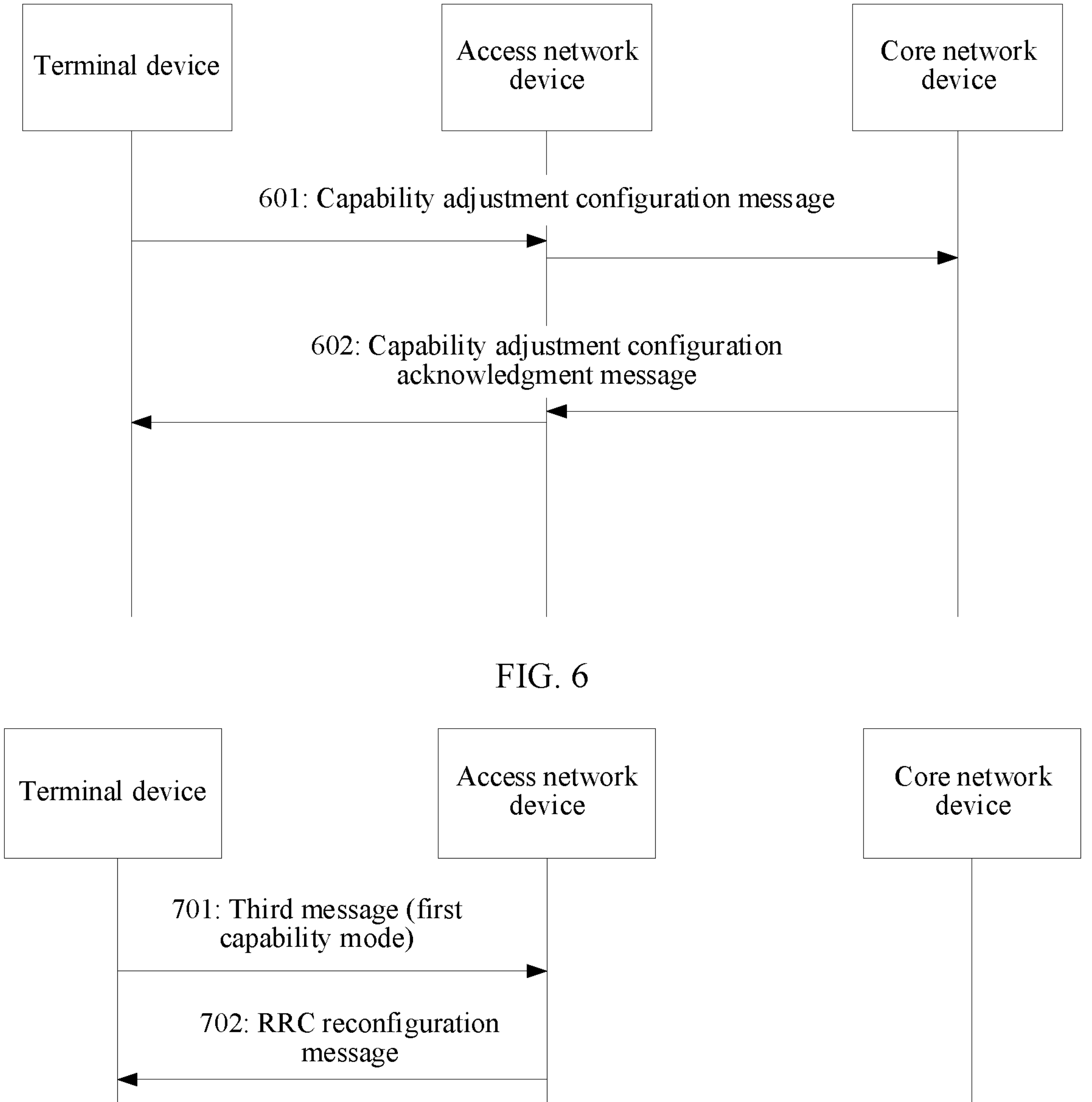
FIG. 6 is a schematic diagram of a capability adjustment configuration procedure according to an embodiment of this application.
FIG. 7 is a schematic diagram of a capability adjustment configuration procedure according to an embodiment of this application.

An example in which the network device is an access network device is used. FIG. 6 is a schematic diagram of a capability adjustment configuration procedure according to this application.

S601: A terminal device sends a capability adjustment configuration message to a core network device. The capability adjustment configuration message may refer to the foregoing second message.

Specific content of N groups of capability information sets included in the second message is not limited. For example, a capability information set includes a capability related to the core network and/or a positioning capability.

In this scenario, the capability adjustment configuration message may be a NAS message, and the terminal device may directly send the capability adjustment configuration message to the core network device.

S602: The core network device sends a capability adjustment configuration acknowledgment message to the terminal device. The capability adjustment configuration acknowledgment message may refer to the foregoing first message.

Through the foregoing process, the terminal device can determine, by performing pre-negotiation with the network device, that the terminal device may select a capability mode from the M capability modes to perform capability adjustment, thereby increasing autonomy of capability adjustment of the terminal device. In addition, the terminal device has reported a capability mode that may be adjusted to the network device in advance. Therefore, when a terminal capability mode changes, complexity of scheduling the terminal device in a multi-capability mode by the network device can be reduced.

In this embodiment of this application, after the terminal device and the network device pre-negotiate the M capability modes, the terminal device or the network device may trigger to perform capability adjustment on the terminal device. The network device may be the access network device or the core network device. The access network device may refer to a gNB, an eNB, or the like, and the core network device may refer to an access and mobility management function (access and mobility management function, AMF) network element, a location management function (location management function, LMF) network element, or the like. This is described in different cases in the following.

Implementation One:

In the capability adjustment configuration procedure, a triggering manner of capability adjustment may be that the terminal device actively triggers capability adjustment, that is, a first triggering manner. In the first triggering manner, when the terminal device needs to perform capability adjustment, the terminal device sends a capability mode adjustment indication to the network device. This is described in different cases in the following.

FIG. 7 is a schematic diagram of a capability adjustment procedure according to an embodiment of this application. In the procedure shown in FIG. 7, an example in which a network device is an access network device is used, and the method includes the following steps.

S701: A terminal device sends a third message to the access network device.

The third message may also be referred to as a name such as an on-demand capability adjustment request message.

It should be noted that, the terminal device may send the third message to the access network device when the terminal device is in an RRC-connected state or an RRC non-connected state. For example, when the terminal device is in an RRC inactive (inactive) state, the third message may be carried by using an RRC restoration request message; and when the terminal device is in an RRC idle (idle) state, the third message may be carried by using an RRC establishment request message.

The third message indicates to adjust a capability mode of the terminal device to a first capability mode. The third message may include third indication information, the third indication information indicates the first capability mode, and the first capability mode is a capability mode that the terminal device expects to use.

It should be noted that, the first capability mode is one capability mode selected by the terminal device from M capability modes. How the selection is performed is not limited in this application.

The third message may further include other content. For example, the third message may further include fourth indication information, and the fourth indication information indicates an adjustment reason or an adjustment purpose of the first capability mode. The third message may further include fifth indication information, and the fifth indication information indicates application duration of the first capability mode. The third message may further include a capability information set corresponding to the first capability mode.

S702: The access network device sends an RRC reconfiguration message to the terminal device.

After receiving the third message, the access network device may store information such as the first capability mode indicated in the third message, and perform RRC reconfiguration based on the first capability mode.

After performing RRC reconfiguration, the access network device may perform resource scheduling based on the first capability mode indicated by the terminal device, and communicate with the terminal device based on the first capability mode.

Optionally, S703: The access network device sends the third indication information to a core network device.

When determining that the application duration corresponding to the first capability mode is greater than a threshold, the access network device may further send the third indication information to the core network device, and the core network device may update and store the first capability mode. When the terminal device performs switching, a switched access network device may obtain, from the core network device, a capability mode currently used by the terminal device.

If the terminal device does not receive the RRC reconfiguration message within a preset time after sending the third message, the terminal device actively adjusts the capability mode to the first capability mode. Alternatively, after receiving the RRC reconfiguration message, if the terminal device determines that the access network device does not perform RRC reconfiguration based on the first capability mode during RRC reconfiguration, and a configured capability exceeds a capability of the terminal device, the terminal device may adjust the capability mode to a required first capability mode.

Optionally, the terminal device may further indicate the access network device to adjust the capability mode to the first capability mode. For example, the terminal device may perform S704.

Optionally, S704: The terminal device sends an RRC reconfiguration failure message to the access network device.

The RRC reconfiguration failure message indicates to adjust the capability mode to the first capability mode, and the terminal device performs communication based on the adjusted first capability mode.

For example, the capability information set corresponding to the first capability mode is: A maximum carrier bandwidth is 20 MHz, and a maximum number of aggregated carriers is 4. If the terminal device determines, based on the RRC reconfiguration message, that the maximum carrier bandwidth configured by the access network device is 200 MHz and the maximum number of aggregated carriers is 8, the terminal device may send the RRC reconfiguration failure message.

Figure 8:
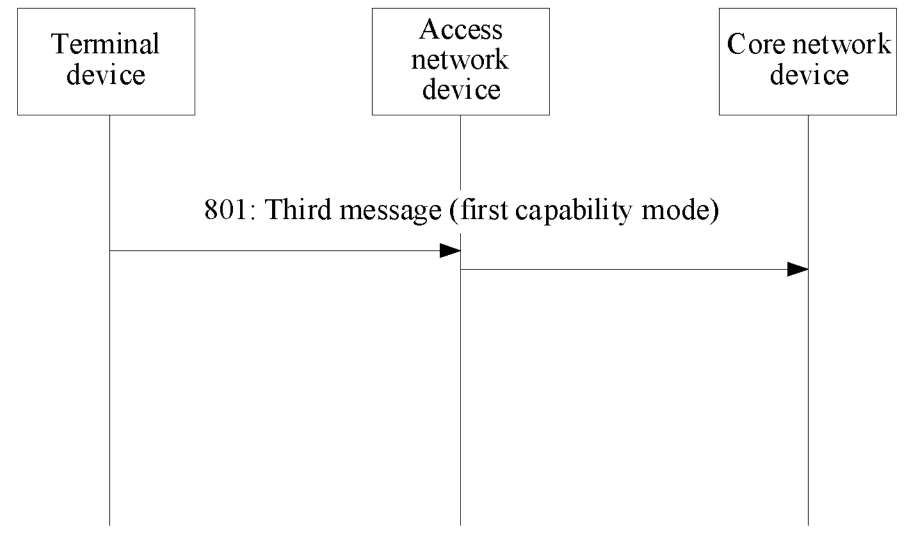
FIG. 8 is a schematic diagram of a capability adjustment configuration procedure according to an embodiment of this application.

FIG. 8 is a schematic diagram of a capability adjustment procedure according to an embodiment of this application. In the procedure shown in FIG. 8, an example in which a network device is a core network device is used as an example, and the method includes the following steps.

S801: A terminal device sends a third message to the core network device.

The third message may also be referred to as a name such as an on-demand capability adjustment request message. For specific content of the third message, refer to the description in S701. Details are not described herein again.

It should be noted that, in S801, the terminal device may include the third message by using a NAS message. After receiving the third message, the core network device may also forward third indication information in the third message to an access network device. A specific process is not described again.

Implementation Two:

In the capability adjustment configuration procedure, the triggering manner of capability adjustment may further be that the terminal device actively triggers capability adjustment, and the network device confirms performing capability adjustment, that is, a second triggering manner. This is described in different cases in the following.

Figure 9:
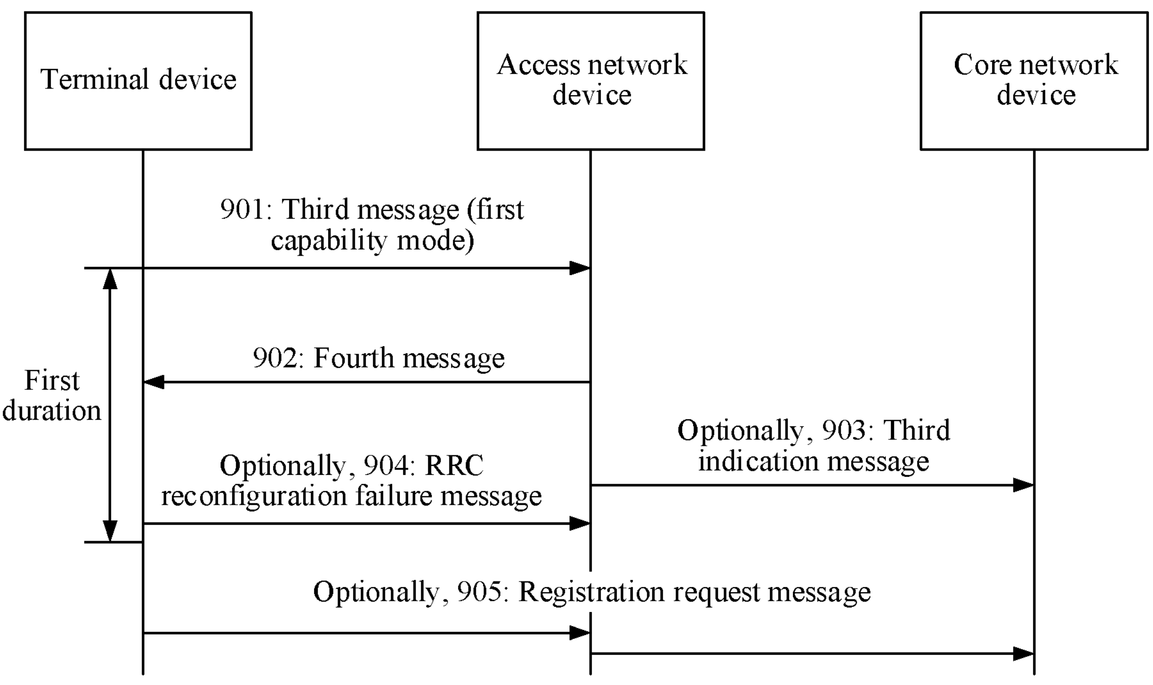
FIG. 9 is a schematic diagram of a capability adjustment configuration procedure according to an embodiment of this application.

FIG. 9 is a schematic diagram of a capability adjustment procedure according to an embodiment of this application. In the procedure shown in FIG. 9, an example in which a network device is an access network device is used, and the method includes the following steps.

S901: A terminal device sends a third message to the access network device.

The third message may also be referred to as a name such as an on-demand capability adjustment request message. For specific content of the third message, refer to the description in S701. Details are not described herein again.

It should be noted that, the terminal device may send the third message to the access network device when the terminal device is in an RRC-connected state or an RRC non-connected state. For example, when the terminal device is in an RRC inactive state, the third message may be carried by using an RRC restoration request message; and when the terminal device is in an RRC idle state, the third message may be carried by using an RRC establishment request message.

S902: The access network device sends a fourth message to the terminal device.

The fourth message may also be referred to as a name such as an on-demand capability adjustment acknowledgment message, and the fourth message indicates to confirm adjusting a capability mode of the terminal device to a first capability mode.

It should be noted that, when the third message is carried by using the RRC restoration request message, the fourth message may be carried by using an RRC restoration acknowledgment message; and when the third message is carried by using the RRC establishment request message, the fourth message may be carried by using an RRC establishment message.

The fourth message may further indicate a restoration manner for restoring a capability of the terminal device before capability adjustment is performed. The restoration manner includes but is not limited to the first restoration manner to the third restoration manner described above. Details are not described again.

Optionally, S903: The access network device sends third indication information to a core network device.

When determining that application duration corresponding to the first capability mode is greater than a threshold, the access network device may further send the third indication information in the third message to the core network device, and the core network device may update and store the first capability mode. When the terminal device performs switching, a switched access network device may obtain, from the core network device, a capability mode currently used by the terminal device.

Optionally, S904: The terminal device sends an RRC reconfiguration failure message to the access network device.

After receiving an RRC reconfiguration message, if the terminal device determines that the access network device does not perform RRC reconfiguration based on the first capability mode during RRC reconfiguration, and a configured capability exceeds the capability of the terminal device, the terminal device may adjust the capability mode to a required first capability mode to perform communication. In this case, the terminal device may send the RRC reconfiguration failure message to the access network device, to represent that the terminal device is to perform communication based on the adjusted first capability mode.

In this embodiment of this application, if the terminal device does not receive the fourth message within first duration after sending the third message, the terminal device may perform mobility registration update. For details, refer to S905.

Optionally, S905: The terminal device sends a registration request message to the core network device, where the registration request message is for requesting to perform mobility registration update.

Specifically, the terminal device starts a timer when sending the third message, and timing duration of the timer is the first duration. The terminal device waits to receive the fourth message within a timing period of the timer, and stops the timer if the fourth message is received; and the terminal device sends the registration request message if timing of the timer expires and the fourth message is still not received.

The first duration may be preconfigured, and the first duration may be duration preconfigured for a first capability. The network device may configure corresponding timing duration for each capability mode, and the terminal device may also independently configure corresponding timing duration for each capability mode.

Figures 10, 11:
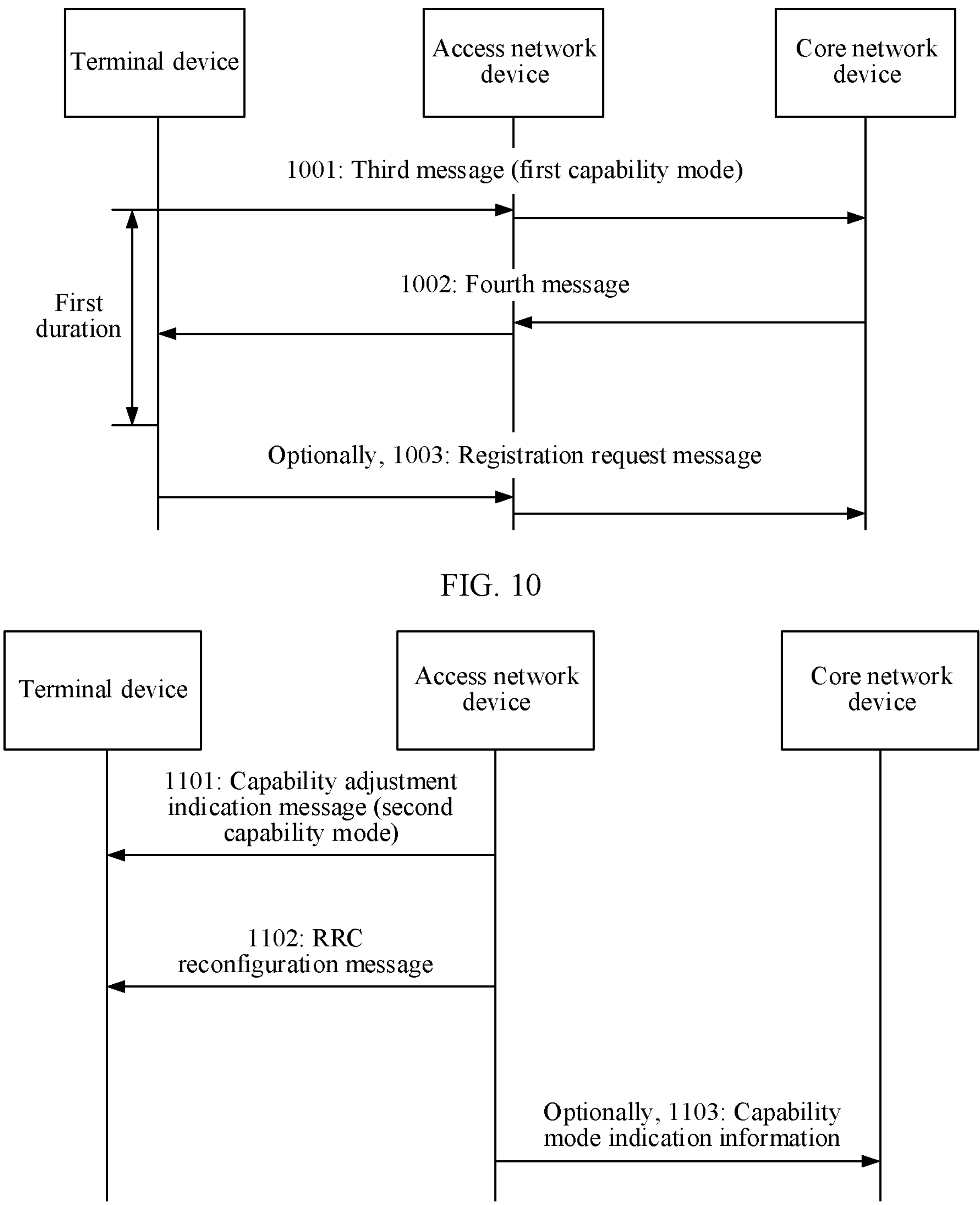
FIG. 10 is a schematic diagram of a capability adjustment configuration procedure according to an embodiment of this application.
FIG. 11 is a schematic diagram of a capability adjustment configuration procedure according to an embodiment of this application.

FIG. 10 is a schematic diagram of a capability adjustment procedure according to an embodiment of this application. In the procedure shown in FIG. 10, an example in which a network device is a core network device is used as an example, and the method includes the following steps.

S1001: A terminal device sends a third message to the core network device.

The third message may also be referred to as a name such as an on-demand capability adjustment request message. For specific content of the third message, refer to the description in S701. Details are not described herein again.

It should be noted that, in S1001, the terminal device may include the third message by using a NAS message. After receiving the third message, the core network device may also forward third indication information in the third message to an access network device. A specific process is not described again.

S1002: The core network device sends a fourth message to the terminal device.

The fourth message may also be referred to as a name such as an on-demand capability adjustment acknowledgment message, and the fourth message indicates to confirm adjusting a capability mode of the terminal device to a first capability mode.

For specific content of the fourth message, refer to the description in S902. Details are not described herein again.

In this embodiment of this application, if the terminal device does not receive the fourth message within first duration after sending the third message, the terminal device may perform mobility registration update. For details, refer to S1003.

Optionally, S1003: The terminal device sends a registration request message to the core network device, where the registration request message is for requesting to perform mobility registration update.

Specifically, the terminal device starts a timer when sending the third message, and timing duration of the timer is the first duration. The terminal device waits to receive the fourth message within a timing period of the timer, and stops the timer if the fourth message is received; and the terminal device sends the registration request message if timing of the timer expires and the fourth message is still not received.

Implementation Three:

In the capability adjustment configuration procedure, the triggering manner of capability adjustment may further be that the network device actively triggers capability adjustment, that is, a third triggering manner. This is described in different cases in the following.

FIG. 11 is a schematic diagram of a capability adjustment procedure according to an embodiment of this application. In the procedure shown in FIG. 11, an example in which a network device is an access network device is used, and the method includes the following steps.

S1101: The access network device sends a capability adjustment indication message to a terminal device.

The capability adjustment indication message indicates to adjust a capability mode of the terminal device to a second capability mode. The second capability mode is a capability mode that the access network device expects the terminal device to use. The second capability mode is one capability mode selected from M capability modes. How the selection is performed is not limited in this application.

The capability adjustment indication message may further indicate an adjustment reason or an adjustment purpose of the second capability mode, and may further indicate information such as application duration of the second capability mode.

It should be noted that, the access network device may adjust a capability of the terminal device based on a purpose such as a service requirement. This is not limited in this embodiment of this application.

S1102: The access network device sends an RRC reconfiguration message to the terminal device.

The access network device may perform RRC reconfiguration based on the second capability mode, thereby sending the RRC reconfiguration message.

After performing RRC reconfiguration, the access network device may perform resource scheduling based on the second capability mode, and communicate with the terminal device based on the second capability mode.

Optionally, S1103: The access network device sends capability mode indication information to a core network device, where the capability mode indication information indicates the second capability mode.

When determining that application duration corresponding to the second capability mode is greater than a threshold, the access network device may further indicate the second capability mode to the core network device, and the core network device may update and store the second capability mode. When the terminal device performs switching, a switched access network device may obtain, from the core network device, a capability mode currently used by the terminal device.

Figure 12:
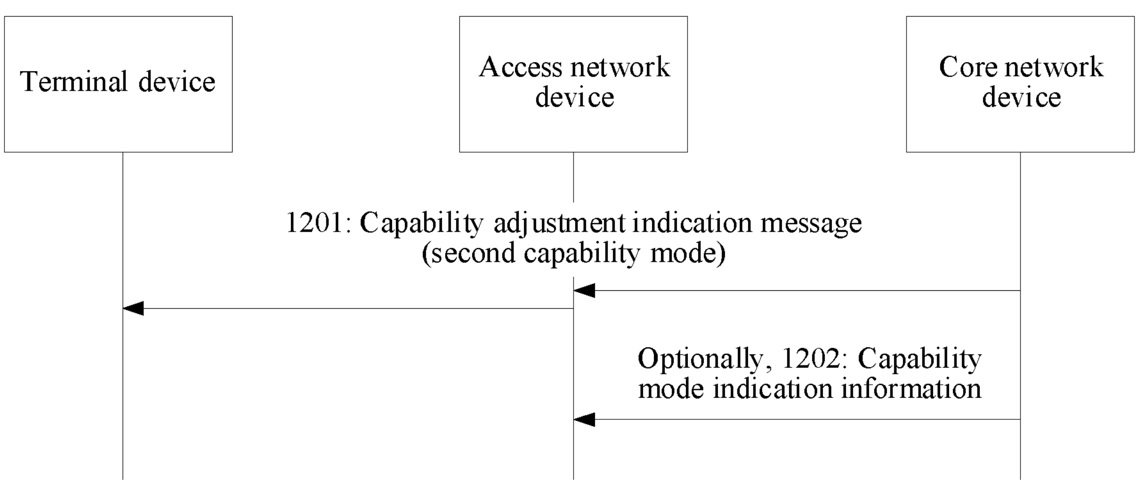
FIG. 12 is a schematic diagram of a capability adjustment configuration procedure according to an embodiment of this application.

FIG. 12 is a schematic diagram of a capability adjustment procedure according to an embodiment of this application. In the procedure shown in FIG. 11, an example in which a network device is a core network device is used as an example, and the method includes the following steps.

S1201: The core network device sends a capability adjustment indication message to a terminal device.

The capability adjustment indication message indicates to adjust a capability mode of the terminal device to a second capability mode. The second capability mode is a capability mode that an access network device expects the terminal device to use. The second capability mode is one capability mode selected from M capability modes. How the selection is performed is not limited in this application.

The capability adjustment indication message may further indicate an adjustment reason or an adjustment purpose of the second capability mode, and may further indicate information such as application duration of the second capability mode.

It should be noted that, in this case, the capability adjustment indication message may be a NAS message.

Optionally, S1202: The core network device sends capability mode indication information to the access network device, where the capability mode indication information indicates the second capability mode.

In the foregoing embodiments provided in this application, the methods provided in embodiments of this application are separately described from a perspective of interaction between devices. To implement functions in the method provided in the foregoing embodiments of this application, the network device or the terminal device may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Module division in embodiments of this application is an example, and is merely logical function division. There may be another division manner in an actual implementation. In addition, function modules in embodiments of this application may be integrated into one processor, or each of the modules may exist alone physically, or two or more modules are integrated into one module. The foregoing integrated module may be implemented in a form of hardware, or may be implemented in a form of a software function module.

Figure 13:
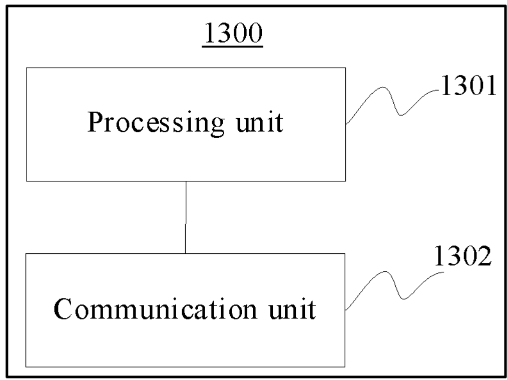
FIG. 13 is a schematic diagram of a structure of a communication apparatus according to an embodiment of this application.

Same as the foregoing concept, as shown in FIG. 13, an embodiment of this application further provides an apparatus 1300, configured to implement a function of the network device or the terminal device in the foregoing methods. For example, the apparatus may be a software module or a chip system. In this embodiment of this application, the chip system may include a chip, or may include a chip and another discrete device. The apparatus 1300 may include: a processing unit 1301 and a communication unit 1302.

In this embodiment of this application, the communication unit may also be referred to as a transceiver unit, and may include a sending unit and/or a receiving unit, which are respectively configured to perform sending and receiving steps of the network device or the terminal device in the foregoing method embodiments.

Figure 14:
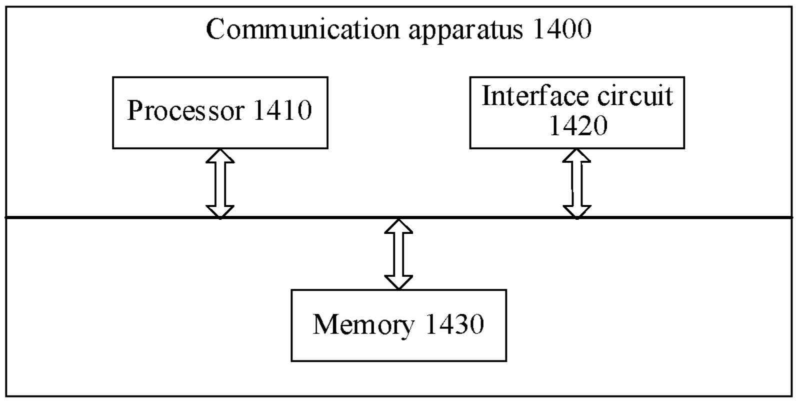
FIG. 14 is a schematic diagram of a structure of a communication apparatus according to an embodiment of this application.

The following describes in detail the communication apparatus provided in this embodiment of this application with reference to FIG. 13 to FIG. 14. It should be understood that description of apparatus embodiments corresponds to the description of the method embodiments. Therefore, for content that is not described in detail, refer to the foregoing method embodiments. For brevity, details are not described herein again.

The communication unit may also be referred to as a transceiver, a transceiver machine, a transceiver apparatus, or the like. The processing unit may also be referred to as a processor, a processing board, a processing module, a processing apparatus, or the like. Optionally, a device configured to implement the receiving function in the communication unit 1302 may be considered as a receiving unit, and a device configured to implement the sending function in the communication unit 1302 may be considered as a sending unit. That is, the communication unit 1302 includes the receiving unit and the sending unit. The communication unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

When the communication apparatus 1300 performs a function of the terminal device in the procedure shown in FIG. 2 in the foregoing embodiment:

the processing unit is configured to determine indication information; and the communication unit is configured to send the indication information to a network device, where the indication information includes a first parameter set, and at least one of first information or second information; the first information indicates an urgency or importance degree of performing data transmission with the network device based on the first parameter set; and the second information indicates to perform a first action or trigger a first event when a rejection message for the indication information is received or no response information for the indication information is received.

When the communication apparatus 1300 performs a function of the network device in the procedure shown in FIG. 2 in the foregoing embodiment:

the communication unit is configured to receive indication information from a terminal device; and the processing unit is configured to determine, based on at least one of first information or second information in the indication information, to change a configuration of the terminal device based on a first parameter set, where the indication information includes the first parameter set, and at least one of the first information or the second information; the first information indicates an urgency or importance degree of performing data transmission by the terminal device with a network device based on the first parameter set; and the second information indicates to perform a first action or trigger a first event when a rejection message for the indication information is received or no response information for the indication information is received.

When the communication apparatus 1300 performs a function of the terminal device in the procedure shown in FIG. 3 in the foregoing embodiment:

the processing unit is configured to determine N groups of candidate configuration information, where N is an integer greater than 0; and one group of candidate configuration information in the N groups of candidate configuration information indicates partial characteristic parameter information in the characteristic parameter information of a first bandwidth part; and the communication unit is configured to send the N groups of candidate configuration information to the terminal device.

When the communication apparatus 1300 performs a function of the network device in the procedure shown in FIG. 3 in the foregoing embodiment:

the processing unit is configured to determine a first message; and the communication unit is configured to send the first message to a terminal device, where the first message includes first indication information, and the first indication information indicates to allow a request to adjust a capability mode of the terminal device to one capability mode in M capability modes; and the M capability modes are some or all of N capability modes, and M is an integer greater than 0 and less than or equal to N.

The foregoing is merely an example. The processing unit 1301 and the communication unit 1302 may further perform other functions. For more detailed description, refer to related description in the method embodiments shown in FIG. 2 to FIG. 12. Details are not described herein again.

FIG. 14 shows an apparatus 1400 according to an embodiment of this application. The apparatus shown in FIG. 14 may be an implementation of a hardware circuit of the apparatus shown in FIG. 13. The communication apparatus is applicable to the foregoing flowchart, and performs functions of the terminal device or the network device in the foregoing method embodiments. For ease of description, FIG. 14 shows only main components of the communication apparatus.

As shown in FIG. 14, the communication apparatus 1400 includes a processor 1410 and an interface circuit 1420. The processor 1410 and the interface circuit 1420 are coupled to each other. It may be understood that the interface circuit 1420 may be a transceiver or an input/output interface. Optionally, the communication apparatus 1400 may further include a memory 1430, configured to store instructions executed by the processor 1410, store input data required by the processor 1410 to run the instructions, or store data generated after the processor 1410 runs the instructions.

When the communication apparatus 1400 is configured to implement the methods shown in FIG. 3 to FIG. 6, the processor 1410 is configured to implement a function of the foregoing processing unit 1301, and the interface circuit 1420 is configured to implement a function of the foregoing communication unit 1302.

When the foregoing communication apparatus is a chip used in a terminal device, the terminal device chip implements functions of the terminal device in the foregoing method embodiments. The terminal device chip receives information from another module (for example, a radio frequency module or an antenna) in the terminal device, where the information is sent by a network device to the terminal device; and alternatively, the terminal device chip sends information to another module (for example, a radio frequency module or an antenna) in the terminal device, where the information is sent by the terminal device to a network device.

When the foregoing communication apparatus is a chip used in a network device, the network device chip implements functions of the network device in the foregoing method embodiments. The network device chip receives information from another module (for example, a radio frequency module or an antenna) in the network device, where the information is sent by a terminal device to the network device; and alternatively, the network device chip sends information to another module (such as a radio frequency module or an antenna) in the network device, where the information is sent by the network device to a terminal device.

It may be understood that, the processor in this embodiment of this application may be a central processing unit (Central Processing Unit, CPU), or may be another general purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic device, a transistor logic device, a hardware component, or any combination thereof. The general purpose processor may be a microprocessor, or may be any conventional processor.

The processor in this embodiment of this application may be a random access memory (Random Access Memory, RAM), a flash memory, a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network device or a terminal device. Certainly, the processor and the storage medium may alternatively exist in the network device or the terminal device as discrete components.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A communication method, comprising:

receiving a first message from a network device, wherein the first message comprises first indication information, and the first indication information indicates to allow a request to adjust a capability mode of a terminal device to one capability mode in M capability modes by allowing the terminal device to send a request message that indicates to adjust the capability mode of the terminal device to the one capability mode to the network device, wherein the first message includes the M capability modes; and the one capability mode in the M capability modes corresponds to a group of capability information sets that include a positioning capability of the terminal device, and M is an integer greater than 0; and determining the M capability modes based on the first message.

2. The method according to claim 1, wherein before the receiving a first message from a network device, the method further comprises:

sending a second message to the network device, wherein the second message comprises second indication information; and the second indication information indicates N capability modes, one capability mode in the N capability modes corresponds to a group of capability information sets, the M capability modes are included in the N capability modes, and N is an integer greater than or equal to M.

3. The method according to claim 1, wherein the method further comprises:

sending a third message to the network device, wherein the third message comprises third indication information, the third indication information indicates a first capability mode, and the first capability mode is one capability mode in the M capability modes; and the third message indicates to adjust the capability mode of the terminal device to the first capability mode.

4. The method according to claim 3, wherein the third message further comprises fourth indication information, and the fourth indication information indicates an adjustment reason or an adjustment purpose of the first capability mode.

5. The communication method according to claim 1, wherein the request message requires feedback that indicates agreeing with content of the request message from the network device.

6. A communication method, comprising:

determining a first message; and sending the first message to a terminal device, wherein the first message comprises first indication information, and the first indication information indicates to allow a request to adjust a capability mode of the terminal device to one capability mode in M capability modes by allowing the terminal device to send a request message that indicates to adjust the capability mode of the terminal device to the one capability mode to a network device, wherein the first message includes the M capability modes; and the one capability mode in the M capability modes corresponds to a group of capability information sets that include a positioning capability of the terminal device, and the M capability modes are included in N capability modes, and Mis an integer greater than 0 and less than or equal to N.

7. The method according to claim 6, wherein the method further comprises:

receiving a second message from the terminal device, wherein the second message comprises second indication information; and the second indication information indicates the N capability modes, one capability mode in the N capability modes corresponds to a group of capability information sets.

8. The method according to claim 6, wherein the method further comprises:

receiving a third message from the terminal device, wherein the third message comprises third indication information, the third indication information indicates a first capability mode, and the first capability mode is one capability mode in the M capability modes; and the third message indicates to adjust the capability mode of the terminal device to the first capability mode.

9. The method according to claim 8, wherein the third message further comprises fourth indication information, and the fourth indication information indicates an adjustment reason or an adjustment purpose of the first capability mode.

10. The communication method according to claim 6, wherein a type of the first message is a broadcast message or a multicast message.

11. An apparatus comprising: one or more processors configured to receive a first message from a network device, wherein the first message comprises first indication information, and the first indication information indicates to allow a request to adjust a capability mode of a terminal device to one capability mode in M capability modes by allowing the terminal device to send a request message that indicates to adjust the capability mode of the terminal device to the one capability mode to the network device, wherein the first message includes the M capability modes; and the one capability mode in the M capability modes corresponds to a group of capability information sets that include a positioning capability of the terminal device, and M is an integer greater than 0; and determine the M capability modes based on the first message.

12. The apparatus according to claim 11, wherein before receiving the first message from the network device, the one or more processors is configured to:

send a second message to the network device, wherein the second message comprises second indication information; and the second indication information indicates N capability modes, one capability mode in the N capability modes corresponds to a group of capability information sets, the M capability modes are included in the N capability modes, and N is an integer greater than or equal to M.

13. The apparatus according to claim 11, wherein the one or more processors is further configured to:

send a third message to the network device, wherein the third message comprises third indication information, the third indication information indicates a first capability mode, and the first capability mode is one capability mode in the M capability modes; and the third message indicates to adjust the capability mode of the terminal device to the first capability mode.

14. The apparatus according to claim 13, wherein the third message further comprises fourth indication information, and the fourth indication information indicates an adjustment reason or an adjustment purpose of the first capability mode.

15. The apparatus according to claim 11, wherein the request message requires feedback that indicates agreeing with content of the request message from the network device.

16. An apparatus comprising: one or more processors configured to determine a first message; and send the first message to a terminal device, wherein the first message comprises first indication information, and the first indication information indicates to allow a request to adjust a capability mode of the terminal device to one capability mode in M capability modes by allowing the terminal device to send a request message that indicates to adjust the capability mode of the terminal device to the one capability mode to a network device, wherein the first message includes the M capability modes; and the one capability mode in the M capability modes corresponds to a group of capability information sets that include a positioning capability of the terminal device, and the M capability modes are included in N capability modes, and M is an integer greater than 0 and less than or equal to N.

17. The apparatus according to claim 16, wherein the one or more processors is further configured to:

receive a second message from the terminal device, wherein the second message comprises second indication information; and the second indication information indicates the N capability modes, one capability mode in the N capability modes corresponds to a group of capability information sets.

18. The apparatus according to claim 16, wherein the one or more processors is further configured to:

receive a third message from the terminal device, wherein the third message comprises third indication information, the third indication information indicates a first capability mode, and the first capability mode is one capability mode in the M capability modes; and the third message indicates to adjust the capability mode of the terminal device to the first capability mode.

19. The apparatus according to claim 18, wherein the third message further comprises fourth indication information, and the fourth indication information indicates an adjustment reason or an adjustment purpose of the first capability mode.

20. The apparatus according to claim 16, wherein a type of the first message is a broadcast message or a multicast message.

* * * * *